US007853376B2

(12) United States Patent
Peng

(10) Patent No.: US 7,853,376 B2

(45) **Date of Patent: *Dec. 14, 2010**

(54) VEHICLE RUNNING-DATA RECORDING DEVICE CAPABLE OF RECORDING MOVING TRACKS AND ENVIRONMENTAL AUDIO/VIDEO DATA

(75) Inventor: Kuei-Snu Peng, Jubei (TW)

(73) Assignee: Shing Chun Co., Ltd., Hsinchu County (TW)

( * ) Notice: Subject to any disclaimer, the term of this patent is extended or adjusted under 35 U.S.C. 154(b) by 777 days.

This patent is subject to a terminal disclaimer.

(21) Appl. No.: 11/270,577

(22) Filed: Nov. 10, 2005

(65) Prior Publication Data

US 2006/0217858 A1 Sep. 28, 2006

(30) Foreign Application Priority Data

Mar. 25, 2005 (TW) .............................. 94204720 U

(51) Int. Cl.
*G06F 7/06* (2006.01)

(52) U.S. Cl. ............................ 701/35; 701/29; 701/33; 340/438; 340/459

(58) Field of Classification Search ................... 701/35, 701/33, 29; 340/438, 459
See application file for complete search history.

(56) References Cited

U.S. PATENT DOCUMENTS 5,270,708 A * 12/1993 Kamishima ............ 340/995.24
5,570,087 A * 10/1996 Lemelson .............. 340/870.05
5,805,079 A * 9/1998 Lemelson .............. 340/870.05
5,862,500 A * 1/1999 Goodwin ..................... 701/35
6,067,488 A * 5/2000 Tano ........................... 701/35
6,076,041 A * 6/2000 Watanabe ................... 701/211
6,122,959 A * 9/2000 Hoshal et al. ................. 73/489
6,144,318 A * 11/2000 Hayashi et al. ........ 340/995.19
6,269,303 B1 * 7/2001 Watanabe et al. ........... 701/209
6,282,490 B1 * 8/2001 Nimura et al. ......... 340/995.14
6,438,472 B1 * 8/2002 Tano et al. ..................... 701/35
6,549,834 B2 * 4/2003 McClellan et al. ............ 701/35
6,915,190 B2 * 7/2005 Galasso ........................ 701/14
7,079,927 B1 * 7/2006 Tano et al. ..................... 701/35
7,184,866 B2 * 2/2007 Squires et al. ................ 701/33

(Continued)

FOREIGN PATENT DOCUMENTS

DE 19611161 A1 * 9/1997

*Primary Examiner*—Khoi Tran
*Assistant Examiner*—Nikhil Sriraman
(74) *Attorney, Agent, or Firm*—Rosenberg, Klein & Lee

(57) ABSTRACT

The present invention discloses a vehicle running-data recording device capable of recording moving tracks and environmental audio/video data, wherein a primary processor processes the received vehicle operational-activity signals and audio/video signals to obtain images with the acquired data embedded thereon in the form of numbers, texts, symbols, or diagrams. In cooperation with a global positioning system, the present invention can plot a moving-track diagram. The primary processor records the vehicle running status and then converts it into files and stores it in a memory. When the user plays the files afterward, he can obtain audio, video, operational-activity, and running-status information simultaneously. The connected external computer can use softwares to plot a time-coordinate vehicle running-information diagram and a space-coordinate moving-track diagram. Accordingly, the present invention provides a vehicle running-data recording device, which can record vehicle running information and can present it in situ, in order to implement the clarification of the accident liability and protect the rights and interests of the driver.

17 Claims, 3 Drawing Sheets

U.S. PATENT DOCUMENTS

| | | | | |
|---|---|---|---|---|
| 7,383,376 | B2 * | 6/2008 | Swanson | 711/104 |
| 7,386,376 | B2 * | 6/2008 | Basir et al. | 701/35 |
| 7,389,178 | B2 * | 6/2008 | Raz et al. | 701/200 |
| 2003/0105585 | A1 * | 6/2003 | Ukita | 701/211 |
| 2003/0212480 | A1 * | 11/2003 | Lutter et al. | 701/33 |
| 2005/0010360 | A1 * | 1/2005 | Nagase et al. | 701/210 |
| 2005/0081629 | A1 * | 4/2005 | Hoshal | 73/504.03 |
| 2005/0131607 | A1 * | 6/2005 | Breed | 701/45 |
| 2006/0217855 | A1 * | 9/2006 | Chinnadurai et al. | 701/29 |
| 2008/0147271 | A1 * | 6/2008 | Breed | 701/36 |
| 2008/0161995 | A1 * | 7/2008 | Nakajima et al. | 701/35 |
| 2008/0234878 | A1 * | 9/2008 | Joao | 701/2 |

* cited by examiner

VEHICLE RUNNING-DATA RECORDING DEVICE CAPABLE OF RECORDING MOVING TRACKS AND ENVIRONMENTAL AUDIO/VIDEO DATA

BACKGROUND OF THE INVENTION

1. Field of the Invention

The present invention relates to a vehicle running-data recording device, particularly to a vehicle running-data recording device capable of recording moving tracks and environmental audio/video data.

2. Description of the Related Art

A vehicle running-data recording device is an electronic device installed in a Vehicle, which can digitally record, store, and display the speed, driving time, driving distance, operational parameters, and status information of the vehicle, and can print the data mentioned above. With those data, a vehicle running-data recording device can effectively record the driving behaviors of a driver and the process of a traffic accident so that a quantified, scientific and fully-intelligent management of vehicle running data can be achieved.

There is a Taiwan patent application No. 86210305 "Digital Vehicle Accident Recording Device", which can capture the video information of vehicle collision during an accident. However, as it does not record the detailed vehicle running status, such as vehicle light usage, speed, turning, braking, etc., it cannot contribute much to the clarification of the accident liability.

There is also a Taiwan patent application No. 86220237 "Vehicle Running-Data Recording Device", which can record the vehicle running data. However, as it does not record the environmental audio/video information, it cannot contribute much to the clarification of the accident liability either. Further, it needs to build extra connections to corresponding vehicle parts respectively; thus, the installation cost thereof is raised.

Accordingly, the present invention proposes a vehicle running-data recording device capable of recording moving tracks and environmental audio/video data, which can obtain and record the running data and the environmental audio/video data of a vehicle simultaneously, in order to overcome the abovementioned problems.

SUMMARY OF THE INVENTION

The primary objective of the present invention is to provide a vehicle running-data recording device capable of recording moving tracks and environmental audio/video data, which can simultaneously record the vehicle running information and the environmental audio/video data of a vehicle and can plot a space-coordinate moving-track diagram and a time-coordinate vehicle running-information diagram to implement the clarification of the accident liability.

Another objective of the present invention is to provide a vehicle running-data recording device capable of recording moving tracks and environmental audio/video data, which utilizes the vehicle built-in display device to play the recorded vehicle running information in situ, so that expensive auxiliary equipments can be omitted.

Yet another objective of the present invention is to provide a vehicle running-data recording device capable of recording moving tracks and environmental audio/video data, which utilizes standard communication interfaces having high security and compatibility to transmit data.

Further another objective of the present invention is to provide a vehicle running-data recording device capable of recording moving tracks and environmental audio/video data, which is realized with an integrated circuit, so that the present invention can be miniatured and can be conveniently installed inside a vehicle of limited space, and the fabrication cost thereof can be reduced.

Further another objective of the present invention is to provide a vehicle running-data recording device capable of recording moving tracks and environmental audio/video data, which can transfer data to a specified server anytime via a wireless transmission method lest the capacity of its memory be insufficient.

According to the present invention, an audio/video processor is coupled to multiple cameras and audio pickups, and a primary processor is connected to the communication port of a vehicle computer via a communication interface, and the primary processor is connected to vehicle electromechanical devices via an input interface; via the abovementioned connections, the vehicle running-data recording device of the present invention can receive audio signals, video signals and vehicle running information, and the primary processor stores all the received data to a memory having multiple storage sections; the user can operate an operational panel to read the running-data record from the vehicle audio/video device in situ; otherwise, the record can be transferred to an external computer for advanced analysis via a data-transfer interface lest the witness be insufficient so that the user can submit full witness; further, the present invention is realized with an integrated circuit so that its dimension can be miniatured and it can be installed conveniently.

To enable the objectives, technical contents, characteristics, and accomplishments of the present invention to be more easily understood, the embodiments of the present invention are to be described below in detail in cooperation with the attached drawings.

DETAILED DESCRIPTION OF THE INVENTION

The present invention receives vehicle-running data via an input interface and a communication interface; a primary processor integrates the vehicle-running data, external image and internal sound and stores them in order to record the vehicle running information in detail.

Figure 1:
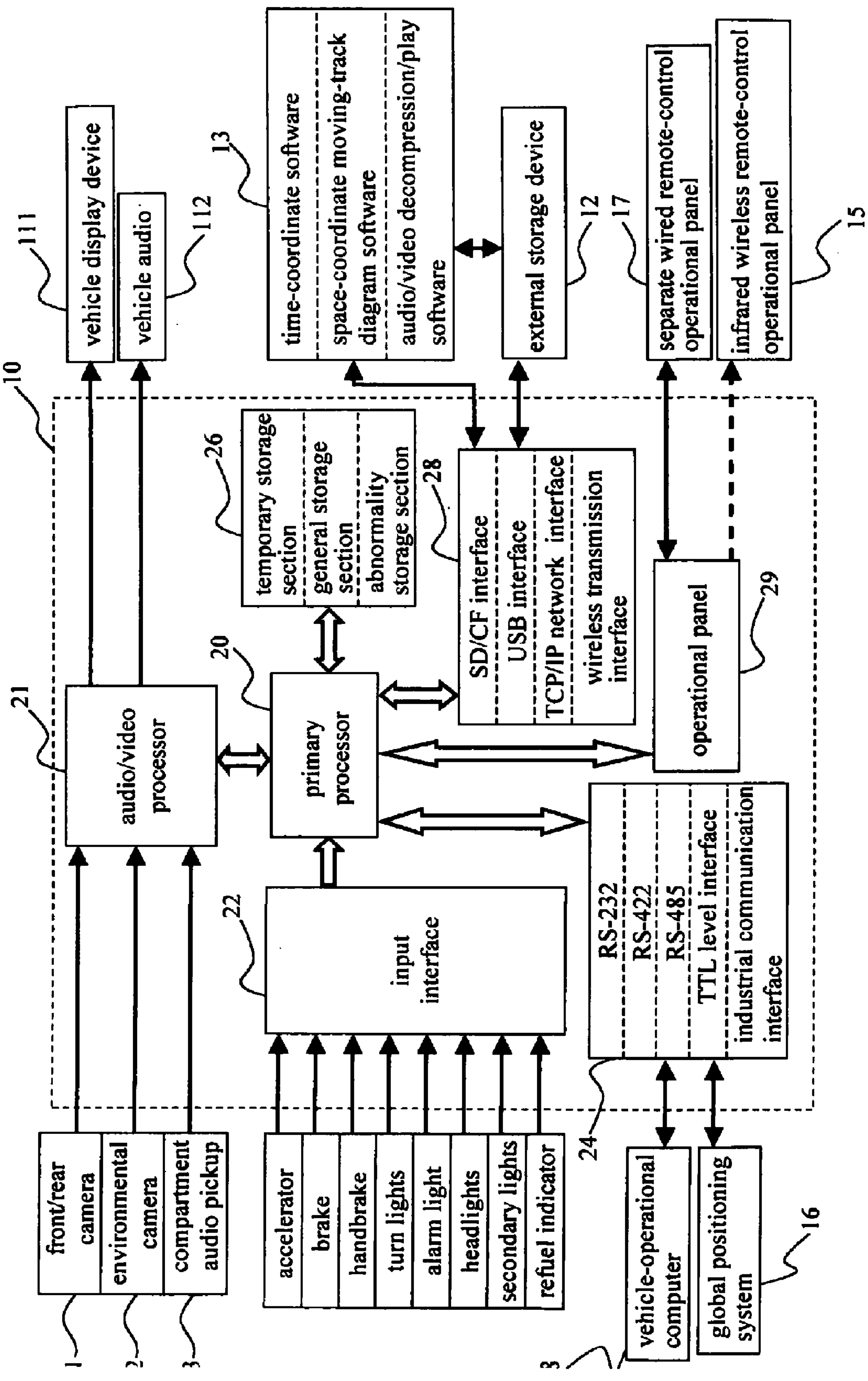
FIG. 1 is a block diagram schematically showing the architecture of the present invention.

Refer to FIG. 1 a block diagram schematically showing the architecture of the present invention. The vehicle running-data recording device 10 of the present invention comprises: a primary processor 20, processing various digital signals; an audio/video processor 21, processing video signals and audio signals, and transmitting them to the primary processor 20; an input interface 22, being a D/I input contact, and receiving operational-activity signals from the electromechanical devices of the vehicle, and transmitting them to the primary processor 20; a communication interface 24, receiving running-status signals from a vehicle-operational computer 18 or a global positioning system 16, and transmitting them to the primary processor 20; a memory 26, providing and storing data for the operation of the primary processor 20, and having multiple storage sections; and a data-transfer interface 28, transferring data to an external storage device 12 or a computer 13. The vehicle running-data recording device 10 of the present invention is to be realized with an integrated circuit. The audio/video processor 21 is connected to multiple external devices, including: a front/rear camera 141, capturing front and rear video signals; an environmental camera 142, capturing environmental video signals; a compartment audio pickup 143, picking up environmental audio signals; a vehicle display device 111 and a vehicle audio 112, playing the recorded vehicle running information. An operational panel 29 is connected to the primary processor 20 and is used as a user interface to control vehicle running-data recording device 10; the operational panel 29 may be an external operational panel, such as a separate wired remote-control operational panel 17 or an infrared wireless remote-control operational panel 15.

The abovementioned data-transfer interface 28 may be an SD (secure digital memory card) interface, a CF (CompactFlash) interface, a USB (universal serial bus) interface, a TCP/IP (Transmission Control Protocol/Internet Protocol) network interface, or a wireless transmission interface. The communication interface 24 may be a RS-232 interface, a RS-422 interface, a RS-485 interface, a TTL (transistor-transistor logic) level interface, or an industrial communication interface, which can prevent electromagnetic interference.

The electromechanical devices connected to the input interface 22 include: the accelerator, the brake, the handbrake, the turn lights, the alarm light, the headlights, the secondary lights (including: the parking lights, taillights, position lights, license plate light and instrument panel lights), the refuel indicator, the oil pressure warning light and the radiator thermometer. The running-status signals received by the vehicle-operational computer 18 includes: ABS activity signals, front/rear collision signals, air bag initiation signals, accelerator operation signals, normal turning signals, turning speed of the steering wheel, hood opening signals, roof vent opening signals, window opening signals, trunk opening signals, distance detected by the back radar, signals of abnormal turning at high speed, vehicle speed, radiator temperature, oil temperature, and oil pressure—those signals that can be quantified.

Figure 2:
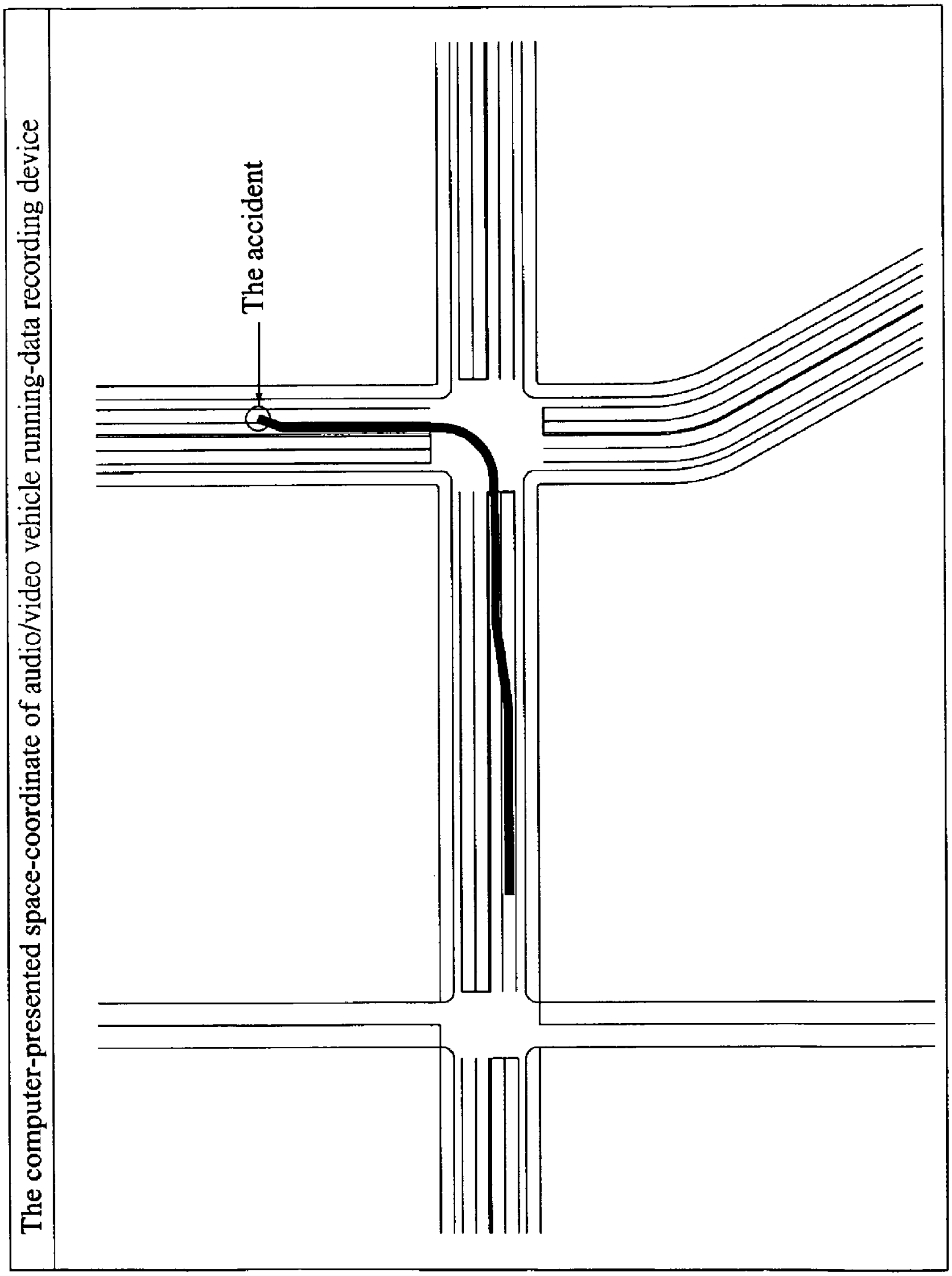
FIG. 2 is a computer-presented space-coordinate moving-track diagram according to the present invention.

When the vehicle is running, the front/rear camera 141 and the environmental camera 142 respectively capture the front, rear and surrounding images and then convert the images into video signals and send the video signals to the audio/video processor 21; the compartment audio pickup 143 receives the sound inside the compartment and then converts the sound into audio signals and send the audio signals to the audio/video processor 21. The audio/video processor 21 receives the audio signals and the video signals and compresses them and then output digital audio signals and digital video signals to the primary processor 20 as a portion of the vehicle running-data record. The primary processor 20 can also read the recorded data and decompress it and then output it to the vehicle display device 111 and the vehicle audio 112. The input interface 22 receives the signals of the switching actions or the voltage variation of the electromechanical devices and converts them into TTL level signals and then outputs the TTL level signals to the primary processor 20 as another portion of the vehicle running-data record. The primary processor 20 is connected to the vehicle-operational computer 18 and the global positioning system 16 via the communication interface 24 and then receives the running-status signals from them as further another portion of the vehicle running-data record. The primary processor 20 records the electronic map and the position data of the global positioning system 18 and the other data as files and then transfers them to the external storage device 12 or the computer 13, and then a software analyzes them to obtain accurate vehicle running data, which can be used to plot a space-coordinate moving-track diagram and a time-coordinate vehicle running-information diagram to indicate the critical point, such as whether there is an abnormal driving behavior like zigzag driving or driving against the flow of traffic, so as to clarify the accident liability. The computer-presented space-coordinate moving-track diagram according to the present invention is shown in FIG. 2. The computer 13 has a time-coordinate software, a space-coordinate moving-track diagram software, and an audio/video decompression/play software.

When the vehicle running-data recording device 10 is initiated to record the vehicle running data, the user can operate the operational panel 29 to play the recorded vehicle running-data file, and the primary processor 20 will send the audio/video data to the vehicle display device 111 and the vehicle audio 112 to completely present the recorded numbers, texts, symbols, diagrams, video data, and audio data. When stopped by the police for the reason of exceeding the speed limit, the driver can play the recorded data and show the recorded speed in situ to clarify whether there is really a violation of the speed limit. When there is a front-to-rear collision occurring, the driver can also play the recorded data and show the recorded images in situ to confirm that he had really pedaled the brake then or he did not mistakenly push the accelerator then. When there is a chain collision occurring, the driver can also play the recorded data show the recorded images in situ to determine whether the user's car collided the front car after the front car had collided the car ahead of the front car or the front car collided the car ahead of the front car after the user's car had collided the front car. After the abovementioned incidents occurred, the driver can submit the backup of the vehicle running-data record to the police or the court as a reference or a witness in order to clarify the condition.

Figure 3:
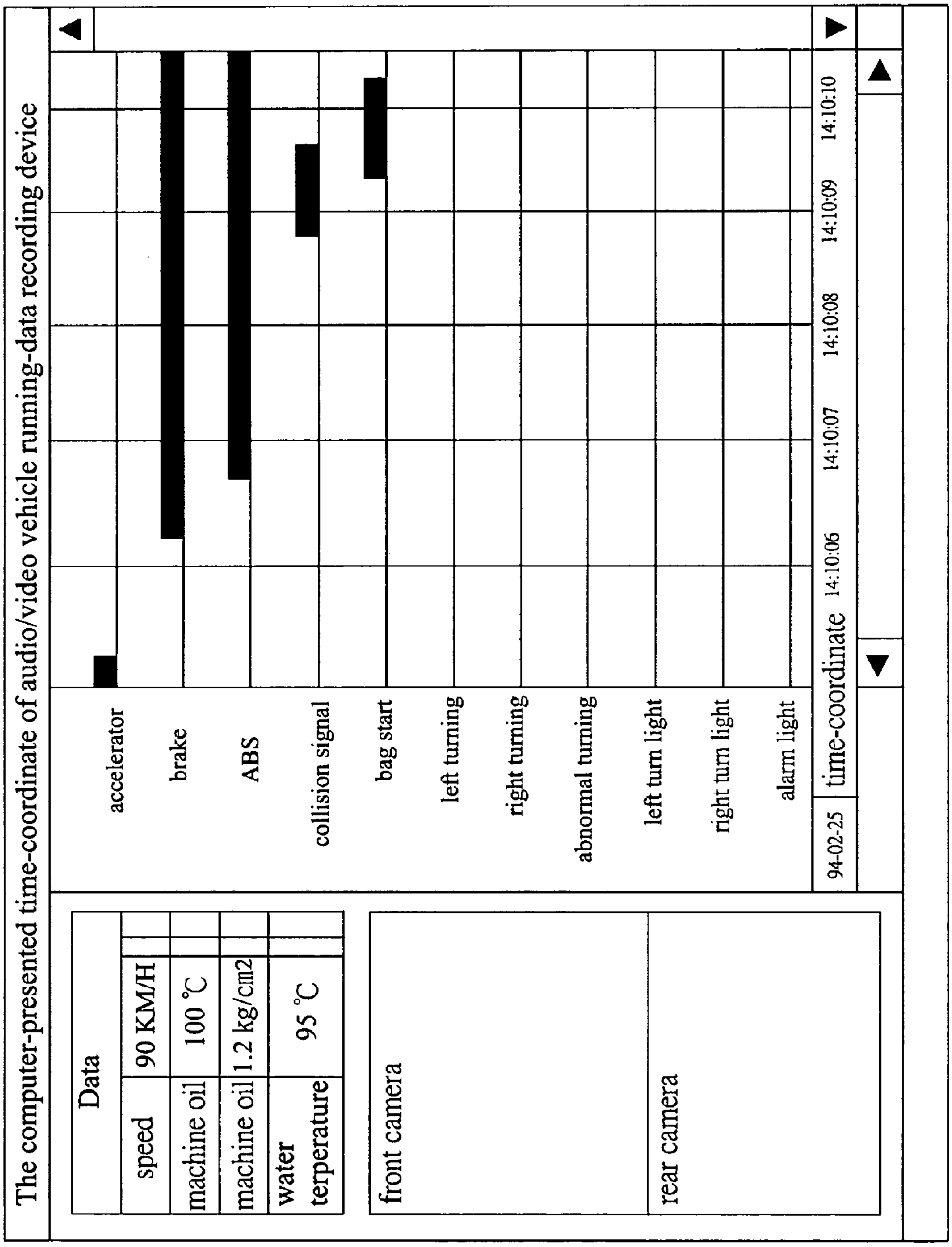
FIG. 3 is a computer-presented time-coordinate vehicle running-information diagram according to the present invention.

The data-transfer interface 28 can transfer the file of the vehicle running data to the external computer 13, and the software can analyze the recorded data to obtain accurate vehicle running information in order to indicate the critical point and can plot the time-coordinate vehicle running-information diagram of the incident to implement the clarification of the accident liability. The computer-presented time-coordinate vehicle running-information diagram according to the present invention is shown in FIG. 3. Further, the vehicle running-data recording device 10 can be used as an administrative tool of the public-transportation drivers. The data-transfer interface 28 can transfer the files of the vehicle running data to a memory card, and when leaving the vehicle, the driver carries the memory card out to store the vehicle running data into a specified computer or a data-collection station. Via software analysis, the driver-administration data, such as driving hours, the number of speed limit violations or other traffic rule violations, etc, can be obtained.

The memory 26 is divided into multiple storage sections, including a temporary storage section, a general storage section and an abnormality storage section, wherein the temporary storage section can store hundreds of seconds of data, and when the temporary storage section is full, the earliest data thereof will be covered by the new data so that the temporary storage section can be repeatably used. Before being covered by the new data, the earliest data will be compressed and then transferred to the general storage section. When there is an incident or an abnormality occurring, tens of seconds of data before and after the incident or abnormality (it can be preset to be XX seconds before and after the incident) will be automatically compressed and then transferred to the abnormality storage region. In normal running, secondary information in the general storage section can be omitted so that the data quantity can be reduced. As the abnormality storage section stores the critical data, the data therein should not be covered until the data transference has been confirmed, and the critical data file in the abnormality storage section cannot be converted into a coverable file until the identity and password have been confirmed. Only the technician of the government-authorized factory can perform the abovementioned data transference, and the authorized factory has the obligation to keep the transferred critical data complete without deletion or damage within the interval specified by the government. The identity of the person who performs the data transference should be recorded, and the catalog of the transferred data should be kept forever.

Further, the vehicle running-data recording device of the present invention can transfer the recorded data from the memory to a specified server anytime via a wireless communication system. When the data transference has been confirmed, the data file is converted to be a coverable one, and then, the memory space occupied by the transferred data file will be used to record new vehicle running data lest the memory capacity be insufficient.

The present invention can also utilize a fixed-point wireless network to transmit data. The public-transportation company can respectively install wireless LAN (Local Area Network) receiving devices in fixed stations. When the vehicle arrives in a station, the present invention will automatically link the wireless LAN, and the recorded data will be divided into multiple packets and then transmitted to the specified server via the wireless LAN receiving device. The storage space occupied by the data file whose upload has been confirmed will be converted into a coverable block; thereby, the problem of memory capacity can be solved with a low-cost method. Therefore, the present invention can provide an effective administrative tool for the public-transportation companies to monitor the latest status of the on-duty vehicles.

The present invention utilizes the abovementioned primary processor as the core of the vehicle running-data recording device. The primary processor can receive video signals, audio signals, operational-activity signals, and running-status signals and then processes the abovementioned signals to obtain a vehicle running-data file. When the user plays the recorded files afterward, he can review the recorded images and read all the abovementioned data, which can be used as a reference or a witness in a traffic accident. The vehicle running data may be further analyzed by softwares in order to plot the time-coordinate vehicle running-information diagram and the space-coordinate moving-track diagram, which can function as forceful evidence. The present invention provide a vehicle running-data recording device capable of recording moving tracks and environmental audio/video data to fully record the vehicle running data and to solve the problem of the conventional technology that cannot record the running data in detail; thereby, the rights and interests of an innocent driver can be protected.

In the present invention, the primary processor is disposed inside a rigid, impact-resistant and fireproof casing in order to protect the equipment and the stored data from damage during an incident.

Those embodiments described above are to clarify the present invention in order to enable the persons skilled in the art to understand, make and use the present invention; however, those are not intended to limit the scope of the present invention. Any equivalent modification and variation according to the spirit of the present invention disclosed herein is to be included within the scope of the claims stated below.

What is claimed is:

1. A vehicle running-data recording device for recording moving tracks and environmental audio/video data, comprising:

an input interface having multiple operational-activity signal input ports and receiving multiple operational-activity signals;

at least one communication interface connected to a vehicle-operational computer and a global positioning system and receiving multiple running-status signals from both the vehicle-operational computer and the global positioning system;

an audio/video processor receiving external audio signals and video signals, compressing/decompressing said audio signals and said video signals, and outputting digital audio signals and digital video signals, wherein said audio signals are input from an audio receiver, said audio receiver being a vehicle compartment pickup;

a primary processor, connected to said input interface, said communication interface, and said audio/video processor, said primary processor processing said running-status signals, said operational-activity signals, said digital audio signals, and said digital video signals, said primary processor actuating simultaneous recording of said running-status, operational-activity, digital audio, and digital video signals collected in time-coordinated manner during vehicle operation thereby generating the moving tracks and environmental audio/video data;

at least one memory, connected to said primary processor for storage, and having multiple data-storage sections including at least one temporary storage section and at least general and abnormality storage sections coupled thereto for the segregated storage of data from said temporary storage section therein based on a criticality determined for the data;

a data-transfer interface, transferring the data to a device external to the vehicle running-data recording device; and, an operational panel coupled to said primary processor, said primary processor configured to control said operational panel for in situ playback of the moving tracks and environmental audio/video data onboard the vehicle.

2. The vehicle running-data recording device for recording moving tracks and environmental audio/video data according to claim 1, wherein said operational panel, which is connected to said primary processor and functions as a human-machine interface.

3. The vehicle running-data recording device for recording moving tracks and environmental audio/video data according to claim 1, wherein said operational panel is external to the vehicle running-data recording device.

4. The vehicle running-data recording device for recording moving tracks and environmental audio/video data according to claim 1, wherein said operational panel is a separate wired remote-control operational panel or an infrared wireless remote-control operational panel.

5. The vehicle running-data recording device for recording moving tracks and environmental audio/video data according to claim 1, further comprising an audio/video output port, which is connected to said audio/video processor and outputs said digital audio signals and said digital video signals to a vehicle audio/video device.

6. The vehicle running-data recording device for recording moving tracks and environmental audio/video data according to claim 1, wherein said data-transfer interface is compatible with an external storage device or a computer.

7. The vehicle running-data recording device for recording moving tracks and environmental audio/video data according to claim 6, wherein said data-transfer interface is compatible with a computer having time-coordinate software, pace-coordinate moving-track diagram software, and audio/video decompression and play software.

8. The vehicle running-data recording device for recording moving tracks and environmental audio/video data according to claim 1, wherein said data-transfer interface is at least one of the group of SD (secure digital memory) interface, CF (Compactflash) interface, USB (Universal Serial Bus) interface, TCP/IP (Transmission Control Protocol/Internet Protocol) network interface and wireless transmission interface.

9. The vehicle running-data recording device for recording moving tracks and environmental audio/video data according to claim 1, wherein said input interface is a digital input contact.

10. The vehicle running-data recording device for recording moving tracks and environmental audio/video data according to claim 1, wherein said communication interface is at least one of the group of RS-232 interface, RS-422 interface, RS-485 interface, TTL (Transistor-Transistor Logic) level interface and industrial communication interface.

11. The vehicle running-data recording device for recording moving tracks and environmental audio/video data according to claim 1, wherein said operational-activity signals are created by electromechanical devices of a running vehicle, and said electromechanical device is at least one of the group of accelerator, brake, handbrake, turn light, alarm light, headlight, secondary light, refuel indicator, oil pressure warning light, radiator thermometer.

12. The vehicle running-data recording device for recording moving tracks and environmental audio/video data according to claim 1, wherein said running-status signals include at least one selected from the group of: ABS activity signal, front/rear collision signal, air bag initiation signal, accelerator operation signal, normal turning signal, turning speed of the steering wheel, hood opening signal, roof vent opening signal, window opening signal, trunk opening signal, distance detected by the back radar, signal of abnormal turning at high speed, vehicle speed, radiator temperature, oil temperature, and oil pressure.

13. The vehicle running-data recording device for recording moving tracks and environmental audio/video data according to claim 1, wherein said video signals are input from multiple external cameras.

14. The vehicle running-data recording device for recording moving tracks and environmental audio/video data according to claim 13, wherein said cameras capture images of areas surrounding the vehicle.

15. The vehicle running-data recording device for recording moving tracks and environmental audio/video data according to claim 1, wherein said primary processor is an integrated circuit.

16. The vehicle running-data recording device for recording moving tracks and environmental audio/video data according to claim 1, wherein said primary processor is disposed inside a rigid, impact-resistant and fireproof casing in order to protect the equipment and the stored data from damage during an incident.

17. The vehicle running-data recording device for recording moving tracks and environmental audio/video data according to claim 1, wherein at least one of said data-storage sections stores critical data, said data-storage section storing critical data being password protected against coverage by new data.

* * * * *